(No Model.) 2 Sheets—Sheet 1.

E. H. JOHNSON.
MEANS FOR TRANSMITTING POWER FROM CAR AXLES.

No. 513,046. Patented Jan. 16, 1894.

Witnesses,

Inventor,
Enos H. Johnson
By Offield, Towle & Linthicum
Attys.

THE NATIONAL LITHOGRAPHING COMPANY,
WASHINGTON, D. C.

(No Model.) 2 Sheets—Sheet 2.
E. H. JOHNSON.
MEANS FOR TRANSMITTING POWER FROM CAR AXLES.
No. 513,046. Patented Jan. 16, 1894.
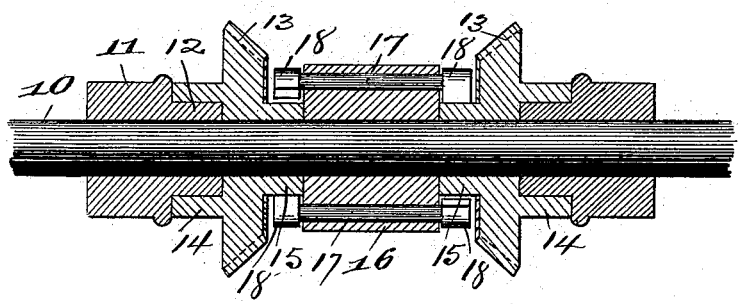
Fig. 1ª.
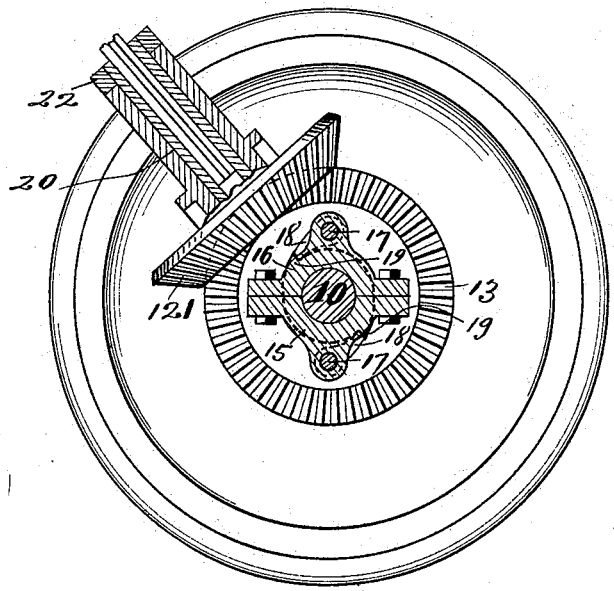
Fig. 2ª.
Witnesses: Inventor,
Enos H. Johnson

UNITED STATES PATENT OFFICE.

ENOS H. JOHNSON, OF CHICAGO, ILLINOIS, ASSIGNOR, BY MESNE ASSIGNMENTS, OF ONE-HALF TO JOSEPH JOHNSON, OF SAME PLACE.

MEANS FOR TRANSMITTING POWER FROM CAR-AXLES.

SPECIFICATION forming part of Letters Patent No. 513,046, dated January 16, 1894.

Application filed March 6, 1893. Serial No. 464,673. (No model.)

*To all whom it may concern:*

Be it known that I, ENOS H. JOHNSON, of Chicago, Illinois, have invented certain new and useful Improvements in Means for Transmitting Power from Car-Axles, of which the following is a specification.

This invention relates to the transmission of power from the revolving axle of a vehicle, such as a railway car; and has for its object to provide a practicable and efficient means of transmitting power to run a dynamo, ventilating fan, or any other machine or engine mounted within or upon the moving vehicle.

Figure 1:
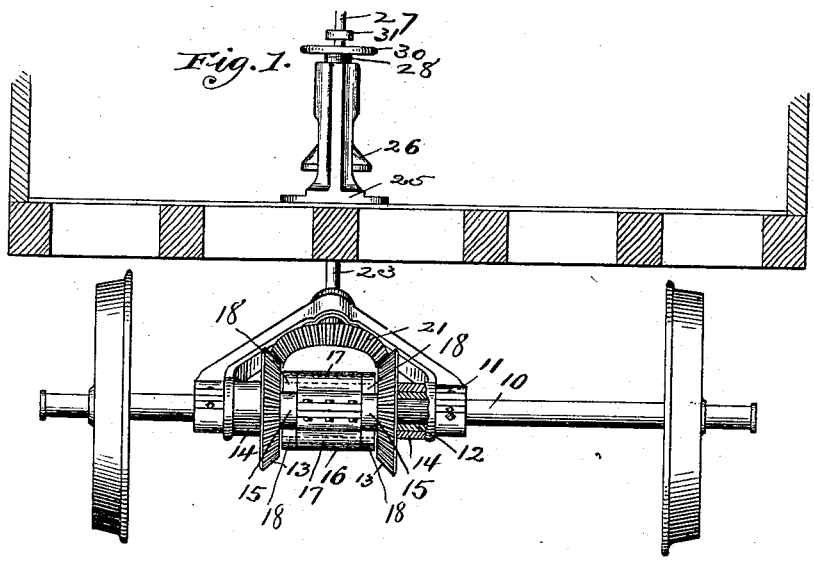
Figure 2:
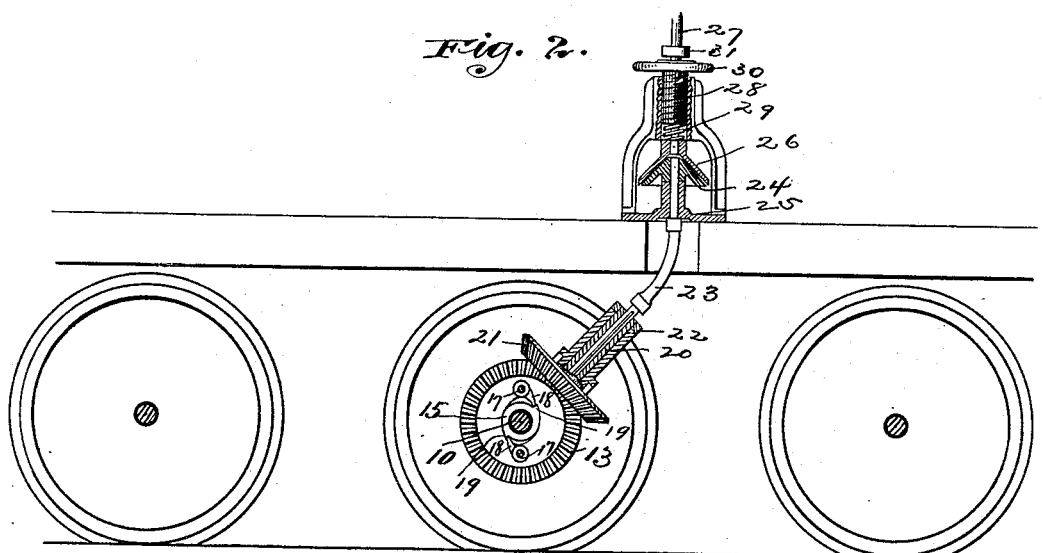
Figure 3:
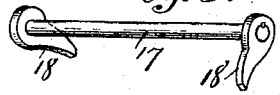

In the accompanying drawings, Figure 1 is a view showing the application of the invention to a railway car, the lower part of the body of the car being shown in transverse section, the upper part broken away. Fig. 2 is a view taken at right angles to Fig. 1, showing one of the longitudinal sills of the car in side elevation. Fig. 1ª is a sectional detail of the gearing applied to the axle. Fig. 2ª is a detail showing one of the car wheels in elevation, the view being a central transverse section through the axle and gearing applied to the axle. Fig. 3 is a detail of the clutch mechanism.

In the drawings, 10 represents a car axle to which is fitted a gear frame 11. Said frame is triangular in general outlines and may consist of a casting having branching arms which are in-turned and fashioned to provide long sleeve bearings 12, said bearings being separable if desired for easier application to the axle.

13 represents miter gears which have sleeved hubs 14 which turn freely upon the sleeve bearings 12, the latter being capable of rotation so that the entire gear frame may rock freely about the axle. The miter gears 13 face each other and are provided on their inner sides with shorter hubs 15 which also encircle the axle and between said hubs there is clamped upon the shaft a divided sleeve 16 which has mounted in longitudinal apertures thereof the rock shafts 17. Each of said shafts bears upon each of its ends a pawl 18, and these pawls are adapted to engage against shoulders 19 formed in or upon the hubs 15 of the miter gears. The pawls upon each of the respective rock shafts project in opposite directions so that when the axle revolves in one direction one of the pawls on each rock shaft will engage its corresponding shoulder or notch in the hub of one of the miter gears so as to drive therefrom while the other gear remains inoperative until the direction of motion of the axle is reversed, whereupon the said last mentioned gear becomes operative thus imparting at all times a motion in the same direction to the driven shaft. Other forms of clutch may be employed. At the apex of the gear frame there is arranged a bearing at right angles to the axle and through which bearing is extended the hub 20 of a bevel gear 21 which is enmeshed with the miter gears 13.

22 represents a collar on the hub 20 outside of the apex of the gear frame, thus holding the gear 21 in proper position to enmesh the miter gears.

23 represents a flexible shaft which is engaged at its lower end with the apertured hub 20 and at its upper end said shaft is secured with a cone friction gear 24 which has a bearing upon the base frame 25, which latter also furnishes a long bearing for the upper end of the flexible shaft. Fitted to work upon this cone gear 24 is an internal cone gear 26 which reversely corresponds to the shape of the cone gear 24. The hub of the internal cone gear 26 is keyed on the end of an upright shaft 27 so as to drive the latter when the cone 26 is frictionally driven.

In order to secure proper frictional engagement of the parts 24, 26, I have employed the follower 28 bearing on the interposed spring 29, said follower having a threaded connection with the stand 25 and being provided with a hand wheel 30 for manipulating it and its upward movement being limited by the stop collar 31 on the shaft 27. The shaft 27 may extend up into the body of the car, where it may transmit power to a dynamo, or other machine or engine, or the shaft may extend horizontally along the floor of the car.

The improvements above described furnish a practicable means for transmitting power from a car axle to machinery located upon the vehicle, the novel characteristic of my invention being the gear frame which is mounted to rock around the axle, thereby conforming to all of the exigencies of travel.

While the flexible shaft is a practicable means for transmitting power from the gearing mounted on the axle, this element is not essential as other means may be employed for transmitting the motion.

I claim—

1. In means for transmitting power from car axles, the combination with the axle, of a gear frame mounted and adapted to rock upon the axle, gear wheels having apertured hubs through which the axle passes, a clutch mechanism secured upon the axle and adapted for operative engagement with one of said gear wheels when the axle turns in one direction and with the other of said gear wheels when said axle turns in the opposite direction, and means for transmitting the power from said wheels to an appliance carried upon the car, substantially as described.

2. In means for transmitting power from car axles, the combination with the axle, of a gear frame having sleeved bearings applied to the axle, gears having extended hubs sleeved over said bearings, a clutch mechanism secured with the axle and adapted for operative engagement with one of said gear wheels when the axle turns in one direction and with the other of said gear wheels when said axle turns in the opposite direction, a driven gear enmeshed with both of the driving gears and a shaft secured with said driven gear, substantially as described.

3. In means for transmitting power from car axles, the combination with the axle, of a gear frame having bearings upon the axle and adapted to rock thereon, gear wheels having extended hubs sleeved upon said gear frame bearings, a clutch mechanism secured with the axle and adapted for engagement with one of said gear wheels when the axle turns in one direction and with the other of said gear wheels when said axle turns in the opposite direction whereby they may be driven alternately, a bevel gear engaged with both of said first named gears and having its bearing in the gear frame and suitable means for transmitting motion from said train of gears, substantially as described.

4. In means for transmitting power from car axles, the combination with the axle, of a frame having extended sleeved bearings on the axle, bevel gears having extended hubs upon their outer sides sleeved over the bearings of the gear frame and shorter hubs upon their inner sides constructed to provide clutch members, a sleeve secured with the axle, oppositely projecting pawls pivotally mounted upon said sleeve and adapted to engage the clutches of the hubs and a bevel gear with which both of said first mentioned gears have driving contact, said bevel gear having its bearing in the frame and adapted to transmit rotary motion from the car axle, substantially as described.

5. In means for transmitting power from car axles, the combination with the car axle, of a gear frame mounted and adapted to rock thereon, gear wheels also mounted upon the axle and a clutch whereby they may be rotatably secured therewith, a bevel gear enmeshed with the driving gears and a flexible shaft operatively connected with said bevel gear and adapted to transmit rotary motion from the car axle to a driven shaft within the car, substantially as described.

6. In means for transmitting power from car axles, the combination with the axle, of a gear frame loosely mounted upon the car axle, gear wheels mounted upon the axle and having beveled faces opposing each other and a clutch mechanism mounted upon the axle intermediate said gears, said clutch mechanism comprising a sleeve member secured with the axle, a shaft or rod having a rocking bearing in said sleeve, said rod carrying on its ends oppositely projecting pawls and the gear wheels having shouldered hubs, the hub on one of the gear wheels being adapted to be engaged by the pawls when the axle turns in one direction and the hub on the other of said gear wheels being engaged by the pawls when the axle turns in the opposite direction and a driven gear with which both of said first mentioned gear wheels engage and whereby the rotation of the axle in either direction may be made to transmit rotary motion to the driven gear and always in the same direction, substantially as described.

7. In means for transmitting power from car axles, the combination with gearing mounted upon and driven by the car axle, a flexible shaft for transmitting said motion, and friction cone gearing mounted within the car body and comprising reversely corresponding cone gears, one member of which is secured with the driving shaft and the other with a driven shaft, substantially as described.

ENOS H. JOHNSON.

Witnesses:
C. C. LINTHICUM,
N. M. BOND.